US010679050B2

(12) United States Patent
Eapen

(10) Patent No.: US 10,679,050 B2
(45) Date of Patent: Jun. 9, 2020

(54) INVALIDATION RECOGNITION AND FRAUD PREVENTION

(71) Applicant: NCR Corporation, Duluth, GA (US)

(72) Inventor: Arun George Eapen, Kitchener (CA)

(73) Assignee: NCR Corporation, Atlanta, GA (US)

(*) Notice: Subject to any disclaimer, the term of this patent is extended or adjusted under 35 U.S.C. 154(b) by 89 days.

(21) Appl. No.: 15/883,814

(22) Filed: Jan. 30, 2018

(65) Prior Publication Data
US 2019/0236349 A1 Aug. 1, 2019

(51) Int. Cl.
G06K 9/00 (2006.01)
G06K 9/34 (2006.01)

(52) U.S. Cl.
CPC ..... *G06K 9/00463* (2013.01); *G06K 9/00456* (2013.01); *G06K 9/344* (2013.01); *G06K 2209/01* (2013.01)

(58) Field of Classification Search
CPC ........... G06K 9/00463; G06K 9/00456; G06K 2209/01
See application file for complete search history.

(56) References Cited

U.S. PATENT DOCUMENTS

| 5,984,364 | A  | * | 11/1999 | Diamond | B41M 3/10 283/58 |
| 7,996,315 | B1 | * | 8/2011  | Smith   | G06Q 20/042 235/379 |
| 7,996,316 | B1 | * | 8/2011  | Smith   | G06Q 20/042 235/379 |
| 8,052,040 | B2 | * | 11/2011 | Stover  | G06Q 20/042 235/379 |
| 8,467,591 | B1 | * | 6/2013  | Csulits | G07D 7/04 382/135 |
| 8,626,656 | B2 | * | 1/2014  | Abrams, Jr. | G06Q 20/04 705/41 |
| 8,644,585 | B1 | * | 2/2014  | Mennie  | G06Q 20/042 382/135 |
| 8,744,967 | B2 | * | 6/2014  | Pinski  | G06Q 20/04 705/44 |
| 8,837,806 | B1 | * | 9/2014  | Ethington | G06Q 20/0425 382/140 |
| 9,129,340 | B1 | * | 9/2015  | Medina, III | G06Q 20/0425 |
| 9,779,392 | B1 | * | 10/2017 | Prasad  | G06Q 20/0425 |
| 2003/0177100 | A1 | * | 9/2003 | Filatov | G06K 9/723 705/64 |
| 2006/0144924 | A1 | * | 7/2006 | Stover  | G06Q 20/042 235/379 |
| 2007/0080207 | A1 | * | 4/2007 | Williams | G06Q 10/02 235/379 |

(Continued)

*Primary Examiner* — Brenda C Bernardi
(74) *Attorney, Agent, or Firm* — Schwegman, Lundberg & Woessner

(57) ABSTRACT

Various embodiments herein each include at least one of systems, devices, software, and methods for invalidation recognition and fraud prevention. One embodiment, in the form of a method, includes identifying a document-type of a received image as a check and identifying each of at least one area of the received image as a zone of the check. This method continues by processing each zone to locate text or symbols indicating the check is non-negotiable and subsequently outputting a non-negotiable rejection indication to prevent further payment processing of the check image.

16 Claims, 4 Drawing Sheets

(56) References Cited

U.S. PATENT DOCUMENTS

| | | | |
|---|---|---|---|
| 2007/0084911 A1* | 4/2007 | Crowell | G06Q 20/042 235/379 |
| 2008/0219543 A1* | 9/2008 | Csulits | G06K 9/033 382/135 |
| 2011/0099105 A1* | 4/2011 | Mennie | G06K 9/033 705/41 |
| 2012/0150745 A1* | 6/2012 | Csulits | G06K 9/033 705/45 |
| 2017/0006114 A1* | 1/2017 | Mande | H04L 67/148 |
| 2017/0287252 A1* | 10/2017 | Laddha | G07D 7/2016 |
| 2018/0101836 A1* | 4/2018 | Nepomniachtchi | G06Q 20/042 |
| 2019/0019020 A1* | 1/2019 | Flament | G06K 9/00442 |
| 2019/0026577 A1* | 1/2019 | Hall | G06K 9/03 |

\* cited by examiner

INVALIDATION RECOGNITION AND FRAUD PREVENTION

BACKGROUND INFORMATION

Options for presentment of checks for deposit and payment in recent years has moved from person-to-person to person-to-machine, device, or process. These new options present new issues for processing of checks. For example, single checks may be presented multiple times for processing, either erroneously or fraudulently. Another example is a check marked as non-negotiable in some way may similarly be presented for processing erroneously or fraudulently. Both situations would have been resolved in person-to-person presentment use cases, but in modern presentment use cases, it is possible for such checks to be processed and the errant or fraudulent transaction providing access to funds. Such situations present exposure to account holders, financial institutions, retailers, and others participants in the check processing ecosystem.

Similarly, other documents are now being processed automatically, from images captured at a time of presentment of a document, such as a passport, travelers checks, cash being deposited at an ATM or presented at a self-service checkout, driver's license or other identity document, and other documents, to a kiosk or other terminal. Such invalidity concerns in these instances present other risks.

SUMMARY

Various embodiments herein each include at least one of systems, devices, software, and methods for invalidation recognition and fraud prevention.

One embodiment, in the form of a method, includes identifying a document-type of a received image as a check and identifying each of at least one area of the received image as a zone of the check. This method continues by processing each zone to locate text or symbols indicating the check is non-negotiable and subsequently outputting a non-negotiable rejection indication to prevent further payment processing of the check image.

Another method embodiment includes receiving a document image, identifying a document-type of the received document image, and identifying each of at least one area of the received document image as a zone of the identified document-type. This method may continue by processing each zone to locate particular text or symbols indicating the document of the document image has an exception status and outputting an indication of the document exception status of the document image when the particular text or symbols are located within the document image.

A further embodiment is in the form of a device that includes an imaging device, a data processor, and a memory storing instructions executable by the data processor to perform data processing activities. The data processing activities may include identifying a document-type of a received image as a check and identifying each of at least one area of the received image as a zone of the check. The data processing activities may further include processing each zone to locate text or symbols indicating the check is non-negotiable and outputting a non-negotiable rejection indication to prevent further payment processing of the check image.

DETAILED DESCRIPTION

Various embodiments herein each include at least one of systems, devices, software, and methods for invalidation recognition and fraud prevention. As mentioned above, options for presentment of checks for deposit and payment in recent years has moved from person-to-person to person-to-machine, device, or process. These new options present new issues for processing of checks. For example, single checks may be presented multiple times for processing, either erroneously or fraudulently. Another example is a check marked as non-negotiable in some way may similarly be presented for processing erroneously or fraudulently. Both situations would have been resolved in person-to-person presentment use cases, but in modern presentment use cases, it is possible for such checks to be processed and the errant or fraudulent transaction providing access to funds. Such situations present exposure to account holders, financial institutions, retailers, and others participants in the check processing ecosystem.

Similarly, other documents are now being processed automatically, from images captured at a time of presentment of a document, such as a passport, travelers checks, cash being deposited at an ATM or presented at a self-service checkout, driver's license or other identity document, and other documents, to a kiosk or other terminal. Such invalidity concerns in these instances present other risks.

Various embodiments herein are directed at detecting such situations to prevent processing invalid documents, such as checks, passports, government issued identification, and other documents marked as such or marked as having been previously processed. Such marks may simply be the text "VOID", "NON-NEGOTIABLE", "SAMPLE", "INVALID", or other text or graphical markings indicating the check is non-negotiable or has already been processed.

Figure 1:
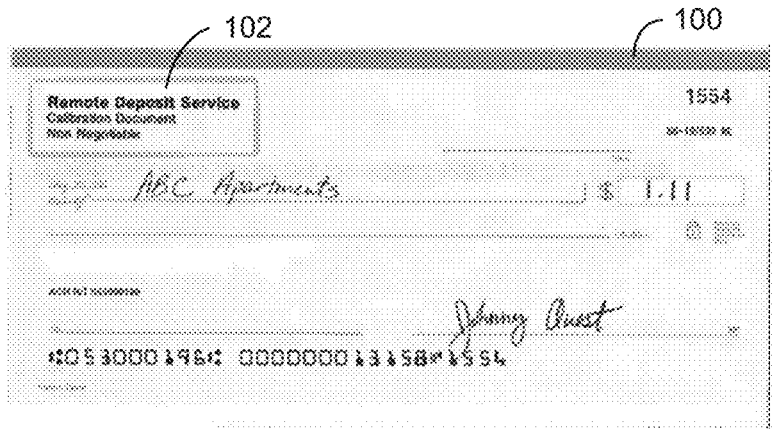
FIG. 1 includes three check image illustrations, according to example embodiments.
Figure 1:
Figure 1:
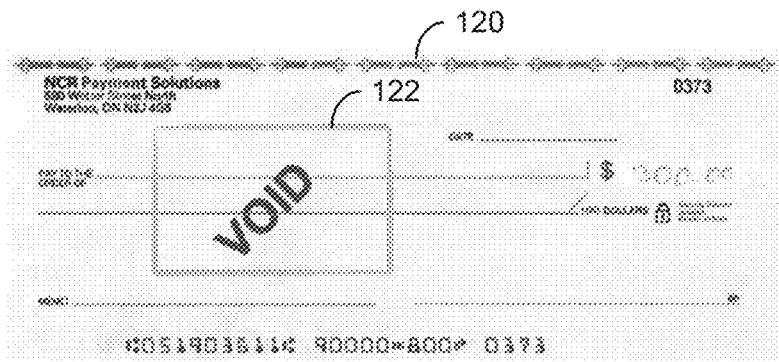

FIG. 1 includes three check image illustrations 100, 110, 120, according to example embodiments. Each of the check image illustrations 100, 110, 120 include a distinct marking 102, 112, 122 at a distinct location indicating the check is non-negotiable, i.e., not to be processed. There are many other types of markings that may be used that either indicate the same or other conditions where a check should not be processed. These indications may be made on a check with text, graphics, or other marks. Such conditions are detected in some embodiments, by image processing software that may be deployed at one or more locations in a check clearing data processing pipeline. In some embodiments, the image processing is deployed at the point where check images are acquired, such as on a mobile device, within a banking or payment app that executes on or on data received from a mobile device or mobile device app. In some other embodiments, the solution may be deployed to a document validation module (e.g., currency and check receiving device, passport reading/scanning device of an airport check-in or immigration kiosk, a mobile device that receives or acquires document images, etc.) of an Automated Teller Machine (ATM), self-service checkout terminal, or other kiosk device depending on the particular embodiment. Some of such embodiments are developed to search for text based on one or both of text obtained from optical character recognition (OCR) performed on a check, passport, or other presented document to obtain text or search for symbols indicating a void, sample, non-negotiable, or other invalidity condition of a presented document. These processes may be configurable with text, images, and pixel patterns to search for within images of presented documents.

These and other embodiments are described in greater detail below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 2:
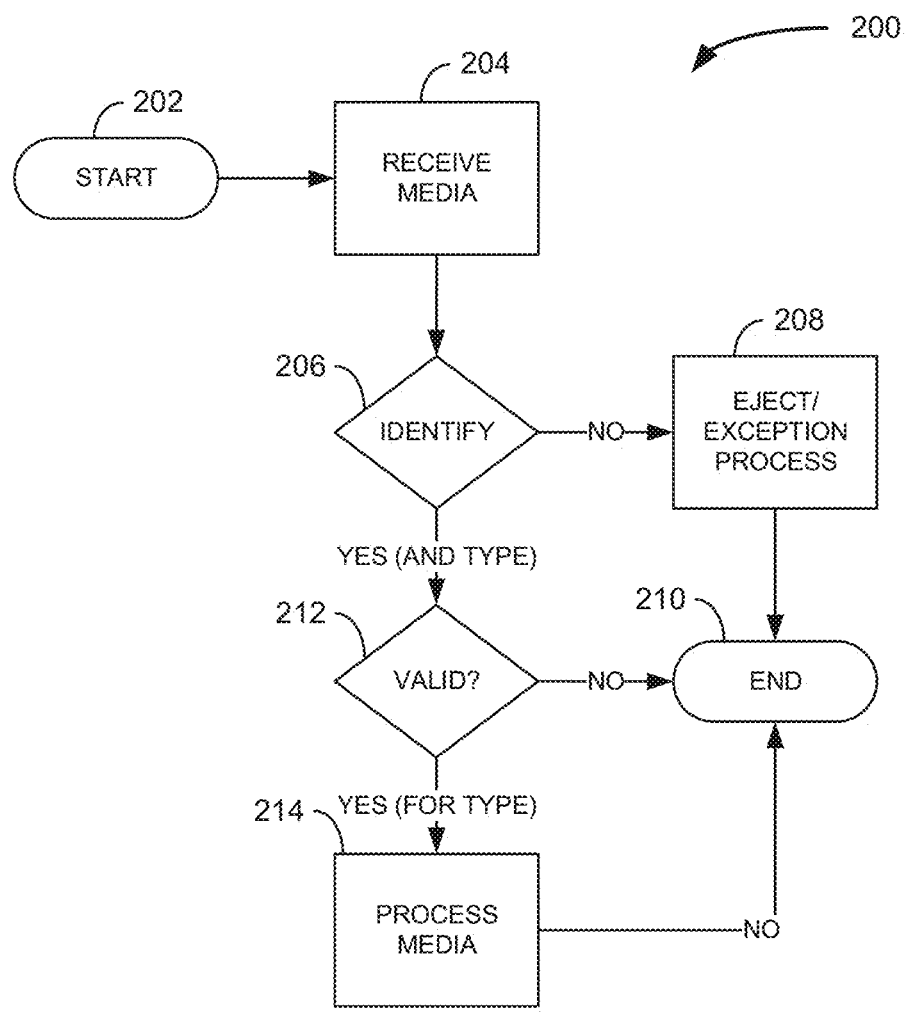
FIG. 2 is a logical flow diagram of a method, according to an example embodiment.

FIG. 2 is a logical flow diagram of a method 200, according to an example embodiment. The method 200 is an example of a method that performs invalidation recognition and fraud prevention. The method 200 may be performed, in some embodiments on one or more of a mobile device, a media input device (e.g., check or passport acceptor, scanner, camera of a mobile device, etc.), a terminal controller/computer such as a computer controlling operation of an ATM, immigration or airline kiosk, or other terminal, a networked server, or on another device.

The method 200 starts 202 by receiving 204 media, such as an image of a document presented to a media input device (e.g., document imaging device, document validation module, document imager/scanner, etc.). The method 200 then attempts to identify the media, such as by comparing the received media with a document template classification model, document classification rules, or the like, and then document classification templates associated with an identified document classification template group. When an identification 206 cannot be made, the method 200 may eject or reject a presented item from which the received 204 media was generated (e.g., currency note, passport, check, etc.), perform exception processing 208, if any, and end 210 the method 200 execution. However, if the received 204 media is identified 206, the method 200 them performs validation 212 on the received 204 media. The validation 212 processing may include performing OCR on the received 204 media in various orientations, in various zones, and directions and searching for certain text. The text may vary based on an identified type of document, particular zones, and the like. The validation 212 may also include searching for images, glyphs, and other pixel arrangements within an entirety of the received 204 media.

If not validated 212, the method 200 may, in some embodiments, eject or reject the presented item from which the received 204 media was generated (e.g., currency note, passport, check, etc.), perform exception processing 208, if any, and end 210 or just simply end 210. If the received 204 media is validated 212, the media may then be processed 214 (e.g., adding currency to an ATM or self-service check-out deposit or payment transaction, allowing entry to a country or issuance of an airplane or other travel boarding pass or ticket, etc.) and the method 200 may then end 210.

Figure 3:
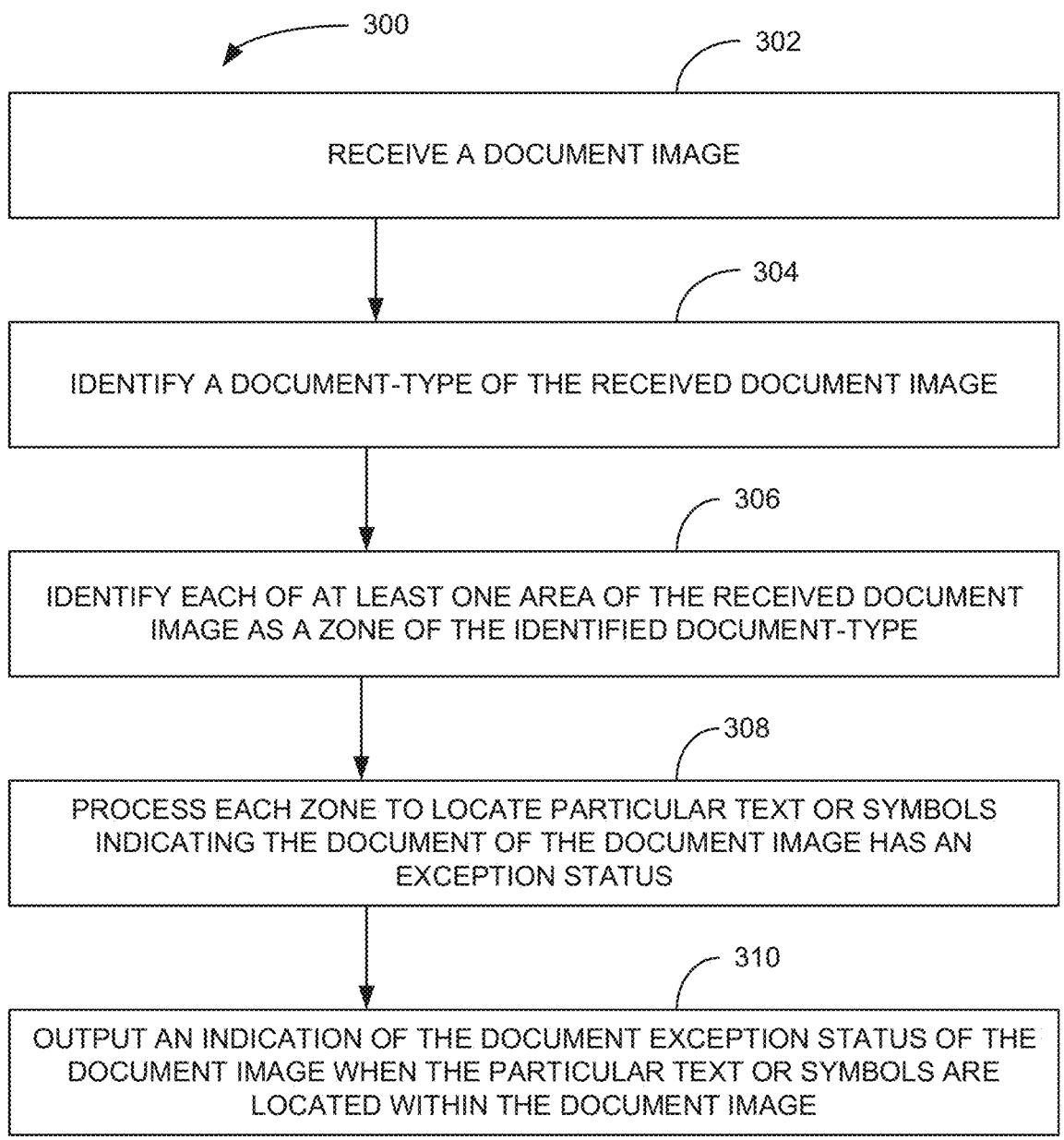
FIG. 3 is a block flow diagram of a method, according to an example embodiment.

FIG. 3 is a block flow diagram of a method 300, according to an example embodiment. The method 300 is an example of a method that performs invalidation recognition and fraud prevention. The method 300 includes receiving 302 a document image, identifying 304 a document-type of the received document image, and identifying 306 each of at least one area of the received document image as a zone of the identified document-type. The method 300 further includes processing 308 each zone to locate particular text or symbols indicating the document of the document image has an exception status. The method 300 may then output 310 an indication of the document exception status of the document image when the particular text or symbols are located within the document image.

In some embodiments of the method 300, the document-type identified is identified in view of at least one document classification template. In some of these embodiments, identifying the received document image includes identifying the document image as a check of a particular check-type based on at least a size of the check represented in the document image as defined within a document classification template. This embodiment further includes identifying each of the at least one area of the received document image as a zone of the check based on the identified check-type. The check-type may be identified based in part on a size of the check represented in the check image. In some embodiments, one zone may be a memo line area of the check represented in the document image.

Figure 4:
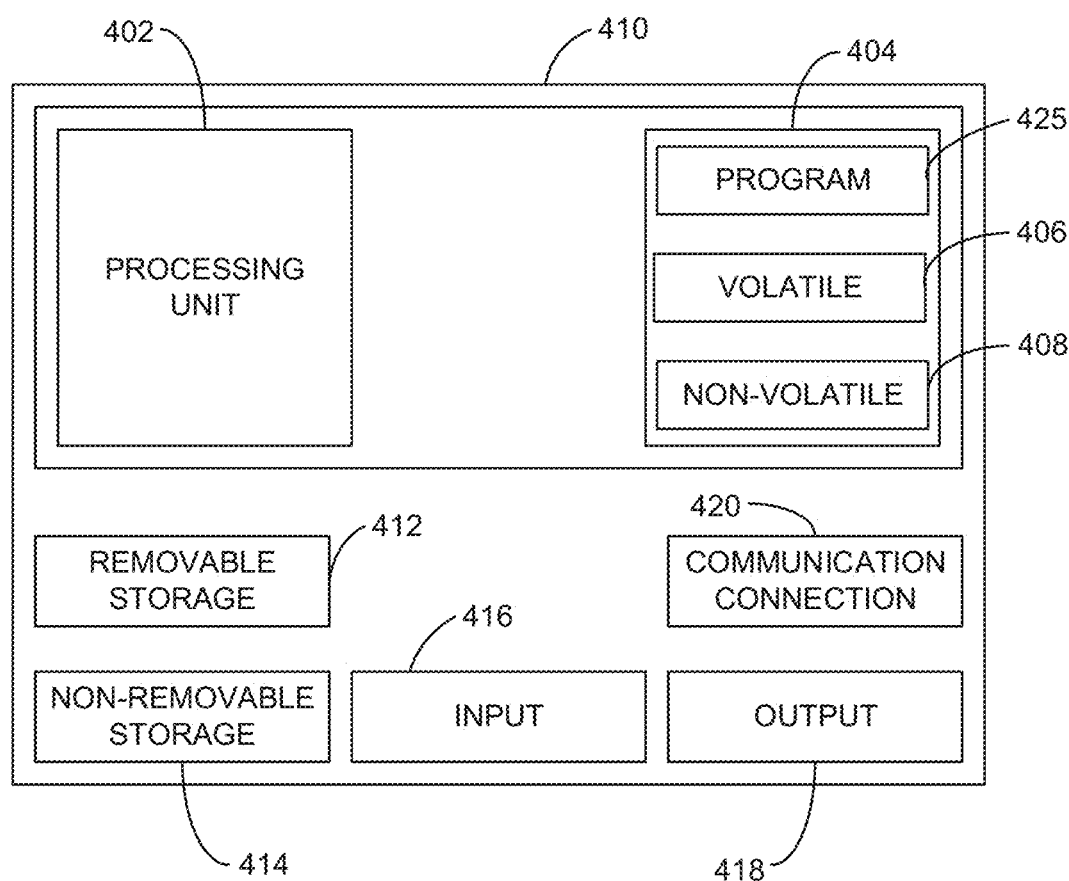
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet. Regardless of the type of computing device of the particular embodiment, the respective computing device may be deployed, implemented, or otherwise utilized as, or in conjunction with, a terminal as described elsewhere above.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a media input device (e.g., currency acceptor, check acceptor, passport scanner), a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   identifying a document-type of a received image as a check;
   identifying each of at least one area of the received image as a zone of the check, the each of at least one area being less than an entirety of the check;
   processing each zone to locate text or symbols indicating the check is non-negotiable;
   outputting a non-negotiable rejection indication to prevent further payment processing of the check image; and
   wherein:
      the processing of each zone includes performing optical character recognition processing on one or more zones or an entirety of the check image; and
      the text or symbols include a configurable list of words that are searched for by the processing following the optical character recognition processing.

2. The method of claim 1, wherein:
   identifying the received image as a check includes identifying a check-type; and
   identifying each of the at least one area of the received image as a zone of the check is performed based on the identified check-type.

3. The method of claim 2, wherein the check-type is identified based at least in part on a size of the check represented in the check image.

4. The method of claim 1, wherein at least one zone is a memo line area of the check represented in the check image.

5. The method of claim 1, wherein the image is received from a document validation module device.

6. The method of claim 5, wherein the document validation module device is a component of a self-service terminal.

7. A method comprising:
   receiving a document image;
   identifying a document-type of the received document image;
   identifying each of at least one area of the received document image as a zone of the identified document-type, each of the at least one area being less than an entirety of the check;
   processing each zone to locate particular text or symbols indicating the document of the document image has an exception status;
   outputting an indication of the document exception status of the document image when the particular text or symbols are located within the document image; and
   wherein:
      the processing of each zone includes performing optical character recognition processing on one or more zones or an entirety of the document image; and
      the text or symbols include a configurable list of words that are searched for by the processing following the optical character recognition processing.

8. The method of claim 7, wherein the document-type identified is identified in view of at least one document classification template.

9. The method of claim 8, wherein:
   identifying the received document image includes identifying the document image as a check of a particular check-type based on at least a size of the check represented in the document image as defined within a document classification template; and identifying each of the at least one area of the received document image as a zone of the check based on the identified check-type.

10. The method of claim 9, wherein the check-type is identified based at least in part on a size of the check represented in the check image.

11. The method of claim 10, wherein at least one zone is a memo line area of the check represented in the document image.

12. The method of claim 7, wherein the document image is received from a document validation module device.

13. The method of claim 12, wherein the document validation module device is a component of a self-service terminal.

14. The method of claim 7, wherein the document image is received from an imaging device of a mobile device.

15. A device comprising:
an imaging device;
a data processor;
a memory storing instructions executable by the data processor to perform data processing activities comprising:

identifying a document-type of a received image as a check;

identifying each of at least one area of the received image as a zone of the check, each of the at least one area being less than an entirety of the check;

processing each zone to locate text or symbols indicating the check is non-negotiable;

outputting a non-negotiable rejection indication to prevent further payment processing of the check image; and wherein:
the processing of each zone includes performing optical character recognition processing on one or more zones or an entirety of the check image; and
the text or symbols include a configurable list of words that are searched for by the processing following the optical character recognition processing.

16. The device of claim 1, wherein the device is a self-service terminal.

* * * * *